United States Patent [19]

Specht

[11] Patent Number: 4,677,041

[45] Date of Patent: Jun. 30, 1987

[54] ELECTRODE ASSEMBLIES FOR ELECTROCHEMICAL CELLS

[75] Inventor: Steven J. Specht, Mentor, Ohio

[73] Assignee: Gould Inc., Rolling Meadows, Ill.

[21] Appl. No.: 835,769

[22] Filed: Mar. 3, 1986

[51] Int. Cl.$^4$ .......................................... H01M 10/24
[52] U.S. Cl. ..................... 429/206; 429/209; 429/210; 429/218
[58] Field of Search ............... 429/206, 207, 209, 210, 429/218, 188

[56] References Cited

U.S. PATENT DOCUMENTS

| | | | |
|---|---|---|---|
| 3,880,671 | 4/1975 | Kordesch et al. | 429/206 X |
| 3,923,542 | 12/1975 | Benda | 429/207 |
| 4,080,489 | 3/1978 | Dey | 429/211 |
| 4,264,690 | 4/1981 | Rao | 429/194 |
| 4,269,907 | 5/1981 | Momyer et al. | 429/210 X |

Primary Examiner—Anthony Skapars
Attorney, Agent, or Firm—Wood, Dalton, Phillips, Mason & Rowe

[57] ABSTRACT

An anode breakthrough coating at the interface of a consumable anode and an electrically conductive metallic substrate of an electrode assembly is useful in minimizing harmful side effects, such as reduced voltage and cell efficiency and generation of heat and hydrogen gas, such as are experienced with prior electrochemical cells near the end of discharge.

The coating may take the form of a perforated electrically insulating layer on the substrate, a layer of material having a high hydrogen overvoltage relative to the metallic substrate bonded to the substrate, an insulating film formed on the portions of the substrate when exposed to the aqueous electrolyte, or a deposited electrolyte solution additive on the exposed substrate surface.

29 Claims, 8 Drawing Figures

ELECTRODE ASSEMBLIES FOR ELECTROCHEMICAL CELLS

BACKGROUND OF THE INVENTION

1. Field of the Invention

This invention relates generally to electrode assemblies useful in electrochemical cells and, more specifically, this invention relates to electrode assemblies for consumable metal electrode/aqueous alkaline electrolyte cells useful in the generation of electrical energy.

2. Description of the Related Art

Electrochemical cells utilizing monopolar or bipolar cell designs having reactive metal electrodes supported on a substrate current collector are well known. See, for example, Momyer et al, U.S. Pat. No. 4,269,907 (May 26, 1981), the disclosure of which is hereby incorporated by reference, wherein cells including an aqueous electrolyte, an anode of an alkali metal, such as lithium, for example, a cathode spaced from the anode, and an intercell electrical connector are disclosed. In such bipolar cells, the cathode may comprise an electrochemically active material, such as silver oxide, and the electrolyte is an alkaline aqueous solution.

Momyer et al also disclose an electrochemical cell stack battery comprising a plurality of bipolar cells connected in series.

The operation of such cells involves the following reactions, which, for illustrative purposes, utilize lithium as the reactive anode and aqueous lithium hydroxide as the electrolyte.

A. Anode Reaction
Electrochemical Dissolution $$Li \rightarrow Li^+_{(aq)} + e^- \quad (1)$$

Formation of Insulating Film on Anode $$Li^+_{(aq)} + OH^-_{(aq)} \rightarrow LiOH_{(aq)} \quad (2)$$

$$LiOH_{(aq)} \rightarrow LiOH_{(s)} \quad (3)$$

Direct Corrosion/Parasitic Reaction $$Li + H_2O \rightarrow LiOH_{(aq)} + \tfrac{1}{2}H_2 \,(g) \quad (4)$$

B. Cathode Reaction
Reduction of Water $$H_2O + e^- \rightarrow OH^- + \tfrac{1}{2}H_2 \,(g) \quad (5)$$

(aq) represents an ion dissolved in water and (s) represents a solid salt.

Reactions (1) and (5) are necessary for the generation of electricity. Reactions (2) and (3) serve to produce a porous insulating film which forms on the anode and protects it. Reaction (4) is a parasitic reaction which generates no useful current.

At the start of discharge, the lithium anode surface is smooth and the gap between the anode and cathode is uniform in size. During discharge, the above-identified reactions serve to remove lithium from the active surface in a non-uniform manner and, as the discharge progresses, the surface of the lithium becomes highly irregular due to local variations in the electrolyte flow velocity, temperature, concentration and/or current density. Toward the end of discharge, when the average lithium thickness is small, some thin spots in the lithium layer will break through the lithium electrode and expose the substrate current collector.

The current collector is made of an electrically conductive metallic substrate, such as nickel. When such a nickel substrate is exposed to the electrolyte, it effectively acts as a cathode for the generation of hydrogen according to equation (4), above. This discharge, however, produces no useful current because the lithium anode and the nickel substrate, now acting as a cathode, are electrically shorted together.

Thus, when the nickel substrate is exposed, a "shorted cell" is created and the current density on the remaining lithium is increased as the lithium anode must now support the current delivered by the cell to the external load as well as the short circuit current resulting from the "shorted cell" created on the anode when the substrate is exposed. By increasing the polarization of the lithium, this extra load reduces the overall cell voltage. Additionally, such a "shorted cell" results in the generation of additional hydrogen gas and heat as well as consumption of lithium, which consequently is not available for supplying current to the load.

In torpedo propulsion batteries, the lithium anode is initially quite thin, resulting in exposure of the nickel substrate well before all available lithium has been utilized to produce useful current. Consequently, the discharge time, when at the full design power output, is substantially reduced.

SUMMARY OF THE INVENTION

It is an object of the present invention to overcome one or more of the problems described above.

According to the present invention, an electrode assembly includes means for providing an anode breakthrough coating on an interface between an anode and a metallic substrate when the interface has been exposed due to partial consumption of the anode. Such a coating reduces the detrimental effects resulting from exposure of the substrate to the electrolyte.

The coating may be in the form of a layer of perforated insulating material bonded to the anode face of the substrate between the substrate and the anode, a thin layer of a material having a high hydrogen overvoltage relative to the metal of the substrate bonded to the substrate at the anode/substrate interface, or a product formed on the substrate upon exposure of the substrate to the aqueous electrolyte, including by deposition of an electrolyte additive upon the substrate.

In addition to the electrode assembly, the invention comprehends an electrochemical battery incorporating such electrode assemblies.

Other objects and advantages of the invention will be apparent to those skilled in the art from the following detailed description taken in conjunction with the drawings and appended claims.

DETAILED DESCRIPTION OF THE INVENTION

According to the invention, an electrode assembly useful in aqueous alkaline electrolyte electrochemical cells is provided. An electrically conductive metallic substrate has a consumable anode disposed thereon in electrical contact with an anode face of the substrate. The anode is adapted to be in direct contact with an aqueous alkaline electrolyte during operation of the cell. The electrode assembly of the invention includes means for providing an anode breakthrough coating on at least the portion of the anode/substrate interface which, due to partial consumption of the anode, is exposed to the electrolyte.

Figure 1:
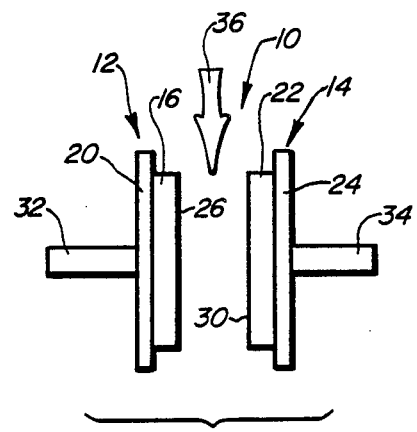
FIG. 1 is a cross-sectional schematic view of an electrochemical battery comprising monopolar electrode assemblies according to a typical embodiment of the invention, prior to the start of discharge.

Referring initially to FIG. 1, an electrochemical cell 10 including an anode electrode assembly 12 and a cathode electrode assembly 14 is shown prior to the start of cell discharge. The anode assembly 12 includes an anode 16 bonded to an electrically conductive current collector 20. The cathode assembly 14 includes a cathode 22 bonded to an electrically conductive current collector 24. The anode 16 and the cathode 22 each define an electrolyte contact surface 26 and 30, respectively. Battery terminals 32 and 34, for the negative and the positive terminals respectively, are in electrical contact with the current collectors 20 and 24. During operation, alkaline aqueous electrolyte flows between and in contact with the anode and cathode surfaces 26 and 30, respectively, as depicted by the arrow 36.

Figure 2:
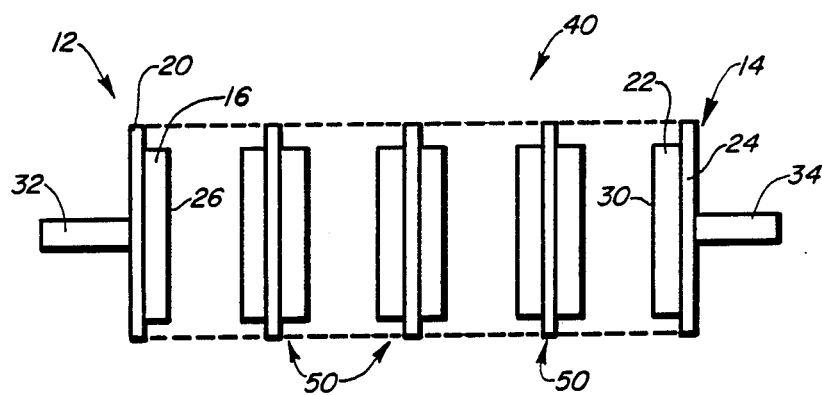
FIG. 2 is a cross-sectional schematic view of an electrochemical battery including bipolar electrode assemblies and monopolar end electrode assemblies according to a typical embodiment of the invention.

Referring to FIG. 2, an electrochemical battery 40 comprising a monopolar anode end electrode 12 and a monopolar cathode end electrode 14 such as the electrode assemblies of FIG. 1, is shown. Three bipolar electrode assemblies 50, described in detail below, are disposed between the two monopolar end electrodes. Thus, the electrochemical battery 40 comprises a plurality of bipolar electrode assemblies connected in series, and is commonly referred to as a cell stack.

The practice of the invention will be described in reference to bipolar electrode assemblies, but it is to be understood that the methods and corresponding structures are also applicable to monopolar electrode assemblies such as that shown in FIGS. 1 and 2.

Figure 3:
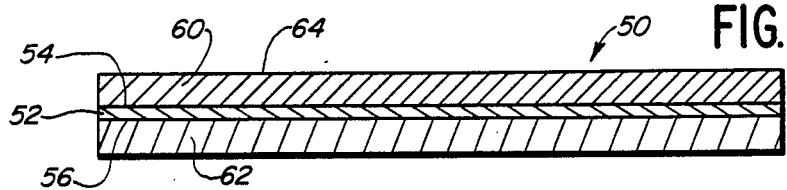
FIG. 3 is a cross-sectional schematic view of a bipolar electrode assembly prior to the start of discharge.

In FIG. 3, a bipolar assembly 50 typical of the prior art is shown prior to the start of cell discharge. The bipolar assembly 50 includes an electrically conductive metallic substrate 52, preferably in the form of a plate, defining an anode face 54 and an opposed cathode face 56 to which are bonded a consumable anode 60 and a cathode 62, respectively. The anode 60 defines an electrolyte contact surface 64.

Both the anode 60 and the cathode 62 are adapted to be in direct contact with an aqueous alkaline electrolyte during operation of an electrochemical cell comprising a plurality of such bipolar assemblies spaced from each other with the anode of at least one assembly spaced from and facing the cathode of an adjacent assembly. At the start of cell discharge, the electrolyte contact surface 64 is smooth and as a result, the gap between the anode 60 and the cathode 62 of an adjacent spaced assembly (not shown) is uniform in size.

Figure 4:
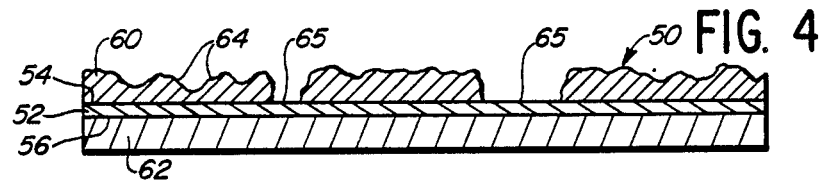
FIG. 4 is a cross-sectional schematic view of a bipolar electrode assembly of the prior art near end of discharge.

As discharge progresses, the anode 60 is consumed, and the electrolyte contact surface 64 of the anode 60 becomes highly irregular due to local variations in operating conditions. Toward the end of discharge, some of the thin spots in the anode 60 will break through forming pits 65 in the anode 60 and exposing the substrate current collector 52 to electrolyte (see FIG. 4). When exposed to electrolyte, the substrate current collector 52 effectively acts as a cathode for the generation of hydrogen according to equation (4), above.

The present invention reduces the area of substrate potentially exposed to electrolyte.

Figure 5:
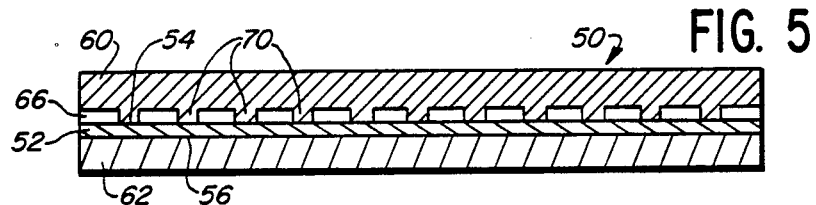
FIGS. 5-8 are cross-sectional schematic views of bipolar electrode assemblies according to typical embodiments of the invention.

FIG. 5 illustrates an embodiment of the invention wherein a layer 66 of an electrically insulating material is placed between the anode 60 and the metallic substrate 52. Perforations 70 are provided through the insulating layer 66 to allow electrical contact between the anode 60 and the substrate 52. The insulating layer 66 restricts the area of the metallic substrate 52 which may potentially be exposed to the electrolyte when a pit 65 (see FIG. 4) develops in the anode 60. The perforations 70 occupy only a small portion of the anode/substrate interface at 54, thereby restricting the "shorted cell" current and hydrogen generation thereby. Such an insulating layer should be:

(1) as thin as possible in order to reduce ohmic losses between the anode and the substrate, and to minimize electrode assembly thickness, especially in the case of bipolar electrodes;
(2) an electrical insulator;
(3) adherent to the substrate and anode;
(4) insoluble in the electrolyte;
(5) non-reactive and non-alloying with the metallic anodic material; and,
(6) thermally stable, thus facilitating storage and safety.

Insulating materials which are useful in the invention include, but are not limited to: polyvinyl chloride (PVC), acrylic resin, plating stop-off paint, epoxy resin, oxidized titanium, oxidized tantalum and oxidized zirconium.

The perforations 70 in the insulating layer 66 can be in the form of holes, strips or any other suitable pattern. The insulating layer 66 may be deposited by any method which results in only partial coverage of the substrate 52, such as spraying, painting, etc. The size and the spacing between the perforations 70 should be small, reducing current distribution non-uniformity in the anode 60 between the perforations 70.

The insulating material may take the form of a plastic material applied or bonded to the anode and substrate surfaces, an oxide coating on the anode and/or substrate surface, a semi-conductor coating or a deposition either by chemical vapor deposition (CVD) or by sputtering, for example.

Alternatively, the insulating material may be a sputtered or CVD metal applied as a partial coverage coating to the substrate which is subsequently oxidized to an insulating layer, only partially covering the substrate. The anode material would then be pressure bonded to the substrate at the open areas between the oxide coated surfaces. Alternatively, the insulating material may take the form of a layer of metal which has been pre-oxidized to form an insulating film and which is then mechanically perforated.

Figure 6:
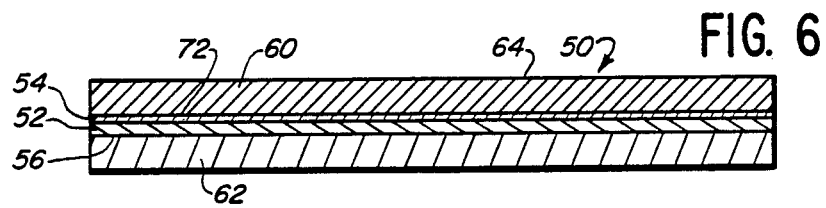
Figure 7:
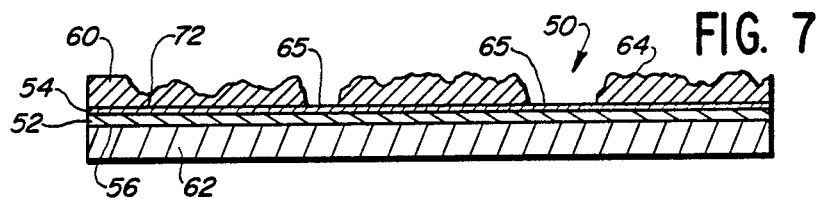

FIG. 6 illustrates an alternative embodiment for providing an anode breakthrough coating at the interface between the anode 60 and the substrate 52. In FIG. 6, a thin, continuous layer 72 of a material having a high hydrogen overvoltage (overpotential) relative to the metal of the substrate 52 is bonded to the substrate 52 at the interface between the substrate 52 and the anode 60. When the anode 60 is eroded (see FIG. 7), the layer 72 of high hydrogen overvoltage material, rather than the substrate 52, is exposed. The high hydrogen overvoltage greatly reduces the rate at which hydrogen can be formed, and thereby reduces the amount of current generated in the "shorted cell".

Figure 8:
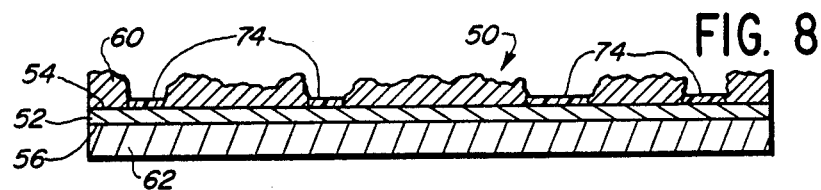

FIG. 8 illustrates an alternative embodiment of the invention which may be prepared in either of two ways. In the first instance, the substrate 52 is made of a metal which will oxidize or otherwise form an insulating film 74 when exposed to the electrolyte. Zirconium, titanium, magnesium, tantalum and alloys thereof are some of the metals that may serve this function in conventional lithium-silver oxide cells. Other possible metals which may be used include: calcium, beryllium, strontium, boron, niobium and yttrium. It is understood that rather than making the substrate of such a material, a continuous layer of the desired material may be deposited thereon which in turn will oxidize or otherwise form an insulating film when exposed to the electrolyte.

The second alternative solution depicted in FIG. 8 is by means of adding a material to the flowing electrolyte which will electrochemically deposit a film 74 on the substrate 52 when the substrate has been exposed at near end of discharge. The film 74 formed by the deposited material insulates the exposed surface and/or results in a high hydrogen overvoltage.

The deposited material should be an electrical insulator or semi-conductor, adherent to the substrate, be stable in the electrolyte, deposit before the potential of the substrate reaches the hydrogen gas evolution potential or deposit quickly after hydrogen gas evolution begins and have a high hydrogen gas over-potential to reduce the hydrogen gas evolution rate. The additive material should be stable in the alkaline electrolyte, not impair the performance of the anode or cathode material, deposit only on exposed substrate areas, be effective in low concentrations in the electrolyte, deposit rapidly when the substrate is exposed and be stable in concentrated forms prior to addition to the electrolyte.

The deposited material may be a metal with high hydrogen overvoltage. Examples of electrolyte additives which deposit as a high hydrogen overvoltage layer include sodium stannate, potassium plumbate and potassium zincate. Alternatively, the deposited material may be a metal which forms a protective insulating or semi-conductor film after deposition or an organic material which selectively coats and electrically isolates the exposed substrate, as well as, prevents electrolyte contact. Cationic surfactants are an example of a material which can perform this function, with fluorinated surfactants, such as the surfactant sold under the commercial designation FC-129 by 3M Co., being especially preferred. Such an organic material may be in the aqueous electrolyte as a monomer which is catalyzed or electrochemically reacted at the substrate to form a polymer which coats the exposed substrate areas. The deposited material, however, should not deposit on the cathode during operation especially if the cathode is silver oxide.

The foregoing detailed description is given for clearness of understanding only, and no unnecessary limitions should be understood therefrom, as modifications within the scope of the invention will be obvious to those skilled in the art.

I claim:

1. An electrochemical cell comprising:
   an aqueous alkaline electrolyte;
   an electrode assembly comprising,
      an electrically conductive metallic substrate defining an anode face,
      an anode disposed on and in electrical contact with said anode face and defining an interface therewith, said anode comprising a metal reactive in the presence of said aqueous electrolyte,
      a layer of electrically insulating material having a plurality of perforations therethrough bonded to said anode face between said substrate and said anode, said perforations permitting electrical contact between said anode and said substrate; and
   a cathode spaced from said anode, said anode and said cathode being in mechanical contact with said aqueous alkaline electrolyte during operation of said cell.

2. The electrochemical cell of claim 1 wherein said electrically insulating material is selected from the group consisting of polyvinyl chloride, acrylic resin, epoxy resin, plating stop-off paint, oxidized titanium, oxidized tantalum, and oxidized zirconium.

3. An electrochemical cell, comprising:
   an aqueous alkaline electrolyte;
   an electrode assembly comprising,
      an electrically conductive metallic substrate defining an anode face,
      an anode disposed on and in electrical contact with said anode face and defining an interface therewith, said anode comprising a metal reactive in the presence of said aqueous electrolyte,
      a substantially continuous layer of a material which has a high hydrogen overvoltage relative to the metal of said substrate bonded to said substrate at said interface; and
   a cathode spaced from said anode, said anode and said cathode being in mechanical contact with said aqueous alakline electrolyte during operation of said cell.

4. The electrochemical cell of claim 3 wherein said high overvoltage material is a metal selected from the group consisting of zinc, cadmium, indium, magnesium, aluminum, lead, copper and tin.

5. An electrochemical cell, comprising:
   an aqueous alkaline electrolyte;
   an electrode assembly comprising,
      an electrically conductive metallic substrate defining an anode face, wherein said substrate comprises a material which forms an electrically insulating film when exposed to said aqueous electrolyte,
      an anode disposed on and in electrical contact with said anode face and defining an interface therewith, said anode comprising a metal reactive in the presence of said aqueous electrolyte; and
   a cathode spaced from said anode, said anode and said cathode being in mechanical contact with said aqueous alkaline electrolyte during operation of said cell.

6. The electrochemical cell of claim 5 wherein said substrate comprises a metal selected from the group consisting of zirconium, titanium, magnesium, tantalum, calcium, beryllium, strontium, boron, niobium and yttrium.

7. An electrochemical cell, comprising:
an aqueous alkaline electrolyte;
an electrode assembly comprising,
   an electrically conductive metallic substrate defining an anode face,
   an anode disposed on and in electrical contact with said anode face and defining an interface therewith, said anode comprising a metal reactive in the presence of said aqueous electrolyte, wherein an additive is present in said aqueous alkaline electrolyte, wherein said additive is deposited on said substrate forming an anode breakthrough coating thereon when said substrate is exposed to said aqueous alkaline electrolyte; and
   a cathode spaced from said anode, said anode and said cathode being in mechanical contact with said aqueous alkaline electrolyte during operation of said cell.

8. An electrochemical cell in accordance with claims 1, 3, 5, or 7 wherein said reactive metal comprises an alkali metal.

9. The electrochemical cell of claim 8 wherein said alkali metal comprises lithium.

10. An electrochemical cell in accordance with claims 1, 3, 5, or 7 wherein said electrically conductive metallic substrate comprises nickel.

11. The electrochemical cell of claim 7 wherein said additive deposits as a material having a high hydrogen overvoltage relative to the metal of said substrate.

12. The electrochemical cell of claim 11 wherein said additive is selected from the group consisting of sodium stannate, potassium plumbate and potassium zincate.

13. The electrochemical cell of claim 7 wherein said additive comprises a cationic surfactant.

14. The electrochemical cell of claim 13 wherein said cationic surfactant comprises a fluorinated surfactant.

15. An electrochemical cell, comprising:
an aqueous alkaline electrolyte;
at least one bipolar electrode assembly comprising,
   an electrically conductive metallic substrate defining an anode face and a cathode face on opposite sides thereof,
   a cathode disposed on said cathode face,
   an anode disposed on and in electrical contact with said anode face and defining an interface therewith, said anode comprising a metal reactive in the presence of said aqueous alkaline electrolyte,
   a layer of electrically insulating material having a plurality of perforations therethrough bonded to said anode face between said substrate and said anode, said perforations permitting electrical contact between said anode and said substrate; and
an anode end electrode and a cathode end electrode spaced from each other and said bipolar electrode assembly, said anode and said cathode of said bipolar assembly and said end electrodes being in contact with said aqueous alkaline electrolyte during operation of said cell.

16. The electrochemical cell assembly of claim 15 wherein said electrically insulating material selected from the group consisting of polyvinyl chloride, arcylic resin, epoxy resin, plating stop-off paint, oxidized titanium, oxidized tantalum, and oxidized zirconium.

17. An electrochemical cell, comprising:
an aqueous alkaline electrolyte;
at least one bipolar electrode assembly comprising,
   an electrically conductive metallic substrate defining an anode face and a cathode face on opposite sides thereof,
   a cathode disposed on said cathode face,
   an anode disposed on and in electrical contact with said anode face and defining an interface therewith, said anode comprising a metal reactive in the presence of said aqueous alkaline electrolyte,
   a substantially continuous layer of a material which has a high hydrogen overvoltage relative to the metal of said substrate bonded to said substrate at said interface; and
an anode end electrode and a cathode end electrode spaced from each other and said bipolar electrode assembly, said anode and said cathode of said bipolar assembly and said end electrodes being in contact with said aqueous alkaline electrolyte during operation of said cell.

18. The electrochemical cell assembly of claim 17 wherein said high overvoltage material is a metal selected from the group consisting of zinc, cadmium, indium, magnesium, aluminum, lead, copper and tin.

19. An electrochemical cell, comprising:
an aqueous alkaline electrolyte;
at least one bipolar electrode assembly comprising,
   an electrically conductive metallic substrate defining an anode face and a cathode face on opposite sides thereof, wherein said substrate comprises a material which forms an electrically insulating film when exposed to said aqueous electrolyte,
   a cathode disposed on said cathode face,
   an anode disposed on and in electrical contact with said anode face and defining an interface therewith, said anode comprising a metal reactive in the presence of said aqueous alkaline electrolyte; and
an anode end electrode and a cathode end electrode spaced from each other and said bipolar electrode assembly, said anode and said cathode of said bipolar assembly and said end electrodes being in contact with said aqueous alkaline electrolyte during operation of said cell.

20. The electrochemical cell assembly of claim 19 wherein said substrate comprises a metal selected from the group consisting of zirconium, titanium, magnesium, tantalum, calcium, beryllium, strontium, boron, niobium and yttrium.

21. An electrochemical cell, comprising:
an aqueous alkaline electrolyte;
at least one bipolar electrode assembly comprising,
   an electrically conductive metallic substrate defining an anode face and a cathode face on opposite sides thereof,
   a cathode disposed on said cathode face,
   an anode disposed on and in electrical contact with said anode face and defining an interface therewith, said anode comprising a metal reactive in the presence of said aqueous alkaline electrolyte, wherein an additive is present in said aqueous alkaline electrolyte, wherein said additive is deposited on said substrate forming an anode breakthrough coating thereon when said substrate is exposed to said aqueous alkaline electrolyte; and
an anode end electrode and a cathode end electrode spaced from each other and said bipolar electrode assembly, said anode and said cathode of said bipolar assembly and said end electrodes being in contact with said aqueous alkaline electrolyte during operation of said cell.

22. The electrochemical cell assembly of claim 21 wherein said additive deposits as a material having a high hydrogen overvoltage relative to the metal of said substrate.

23. The electrochemical cell assembly of claim 22 wherein said additive is selected from the group consisting of sodium stannate, potassium plumbate and potassium zincate.

24. The electrochemical cell assembly of claim 21 wherein said additive comprises a cationic surfactant.

25. The electrochemical cell assembly of claim 24 wherein said cationic surfactant comprises a fluorinated surfactant.

26. An electrochemical cell in accordance with claims 15, 17, 19, or 21 wherein said reactive metal comprises an alkali metal.

27. The electrochemical cell assembly of claim 26 wherein said alkali metal comprises a lithium.

28. An electrochemical cell in accordance with claims 15, 17, 19 or 21 wherein said cathode comprises silver oxide.

29. An electrochemical cell in accordance with claims 15, 17, 19 or 21 wherein said electrically conductive metallic substrate comprises nickel.

* * * * *